(12) United States Patent
Matone, Jr.

(10) Patent No.: US 11,454,477 B1
(45) Date of Patent: Sep. 27, 2022

(54) METHOD AND A DEVICE FOR PROTECTING A RIDER RIDING A BICYCLE FROM ATTACKS FROM AN ATTACKER

(71) Applicant: Charles J. Matone, Jr., Greensburg, PA (US)

(72) Inventor: Charles J. Matone, Jr., Greensburg, PA (US)

(*) Notice: Subject to any disclaimer, the term of this patent is extended or adjusted under 35 U.S.C. 154(b) by 0 days.

(21) Appl. No.: 17/228,499

(22) Filed: Apr. 12, 2021

(51) Int. Cl.
  *F41H 9/10* (2006.01)
  *B62J 27/00* (2020.01)
  *F41H 13/00* (2006.01)

(52) U.S. Cl.
  CPC .............. *F41H 9/10* (2013.01); *B62J 27/00* (2013.01); *F41H 13/0087* (2013.01)

(58) Field of Classification Search
  CPC ........ F41H 9/10; F41H 13/0087; B62J 27/00; G08B 15/02; G08B 15/004; F21J 33/0076; A01M 29/12
  USPC .............................. 42/1.08; 222/178; 362/96
  See application file for complete search history.

(56) References Cited

U.S. PATENT DOCUMENTS

| | | | | |
|---|---|---|---|---|
| 3,677,446 A * | 7/1972 | Guyer, Jr. | ................ | B62J 50/40 |
| | | | | 446/195 |
| 4,807,813 A * | 2/1989 | Coleman | ................ | A63H 33/28 |
| | | | | 239/289 |
| 5,177,467 A * | 1/1993 | Chung-Piao | ......... | G08B 15/004 |
| | | | | 340/432 |
| 5,501,179 A * | 3/1996 | Cory | ..................... | A01K 15/023 |
| | | | | 119/712 |
| D381,711 S * | 7/1997 | Englert | ......................... | D21/572 |
| 6,722,679 B2 * | 4/2004 | Englert | ...................... | B62J 9/22 |
| | | | | 280/288.4 |
| 6,953,135 B2 * | 10/2005 | Litton | ........................ | B62J 9/26 |
| | | | | 224/427 |
| 8,714,464 B2 * | 5/2014 | Carrozza | ................. | B05B 15/62 |
| | | | | 239/289 |
| 9,326,491 B1 * | 5/2016 | Hegarty | .................... | B62J 11/10 |
| 9,395,161 B1 * | 7/2016 | Hegarty | .................... | B62J 11/00 |
| 10,076,110 B2 * | 9/2018 | Schroeder | ............. | A01M 29/00 |
| 2009/0236815 A1 * | 9/2009 | O'Toole | .................... | B62K 9/02 |
| | | | | 280/201 |

(Continued)

*Primary Examiner* — Joshua E Freeman

(57) ABSTRACT

Disclosed is a device and a method for protecting a bicyclist from attacks by persons and/or animals while bicyclist is using the bicycle. The device includes a bracket structure, a safety alarm device, self-defense spray device and a clamp unit. The clamp unit mounts the bracket structure on the bicycle handlebar. The safety alarm device and the self-defense spray device are used to deter/repel/scare off the attacker. The abstract of the disclosure is submitted herewith as required by 37 C.F.R. section. 1.72(b). As stated in 37 C.F.R. section 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

17 Claims, 17 Drawing Sheets

(56) References Cited

U.S. PATENT DOCUMENTS

| | | | |
|---|---|---|---|
| 2013/0140377 A1* | 6/2013 | Carrozza | B05B 15/62 239/172 |
| 2016/0088829 A1* | 3/2016 | Schroeder | B65D 83/752 239/172 |
| 2018/0162472 A1* | 6/2018 | Gherezghiher | B62J 6/055 |
| 2021/0108879 A1* | 4/2021 | Clemons | F41H 9/10 |
| 2022/0013001 A1* | 1/2022 | Thomas | H04W 4/90 |

* cited by examiner

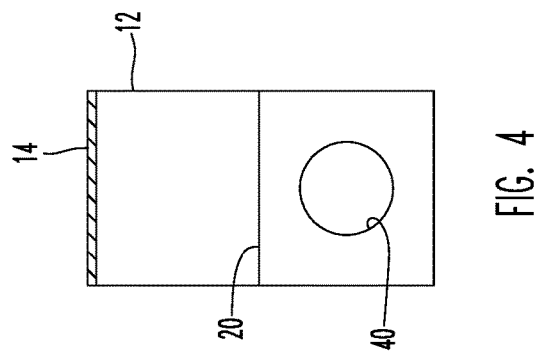
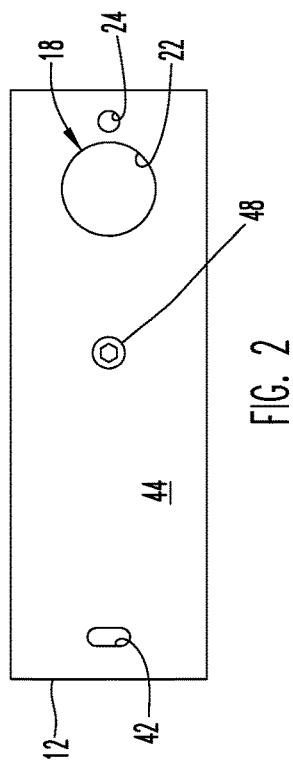
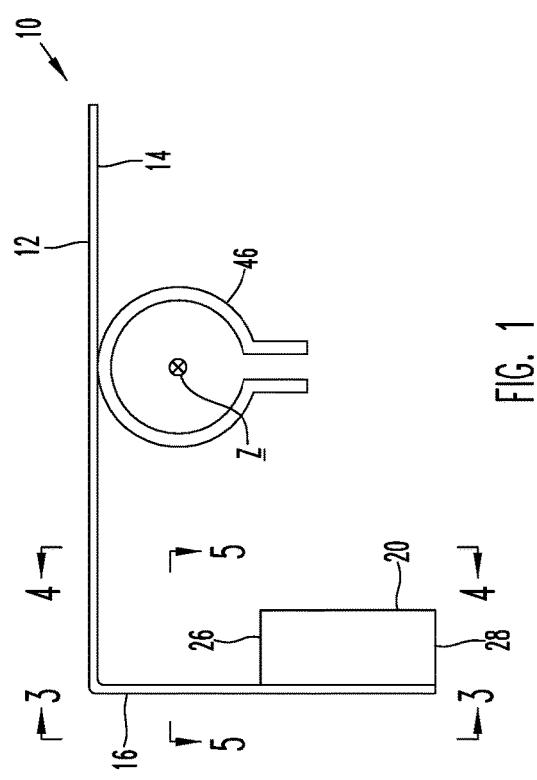
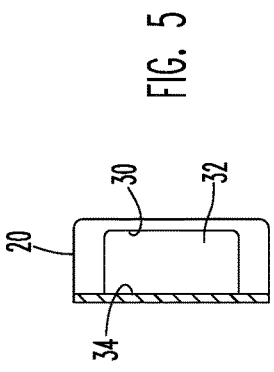
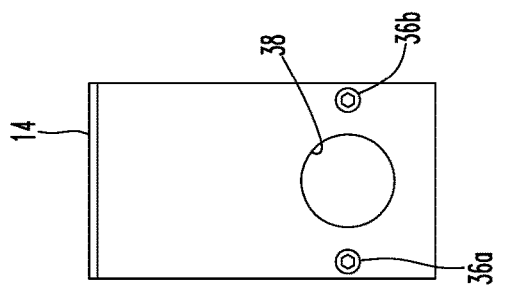

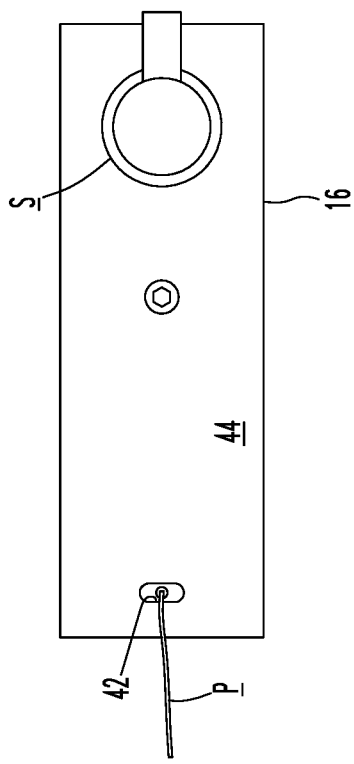
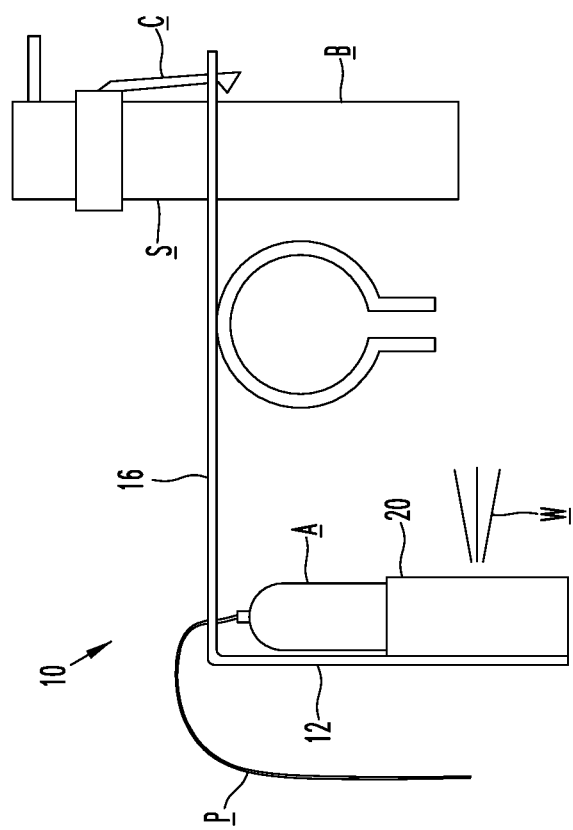

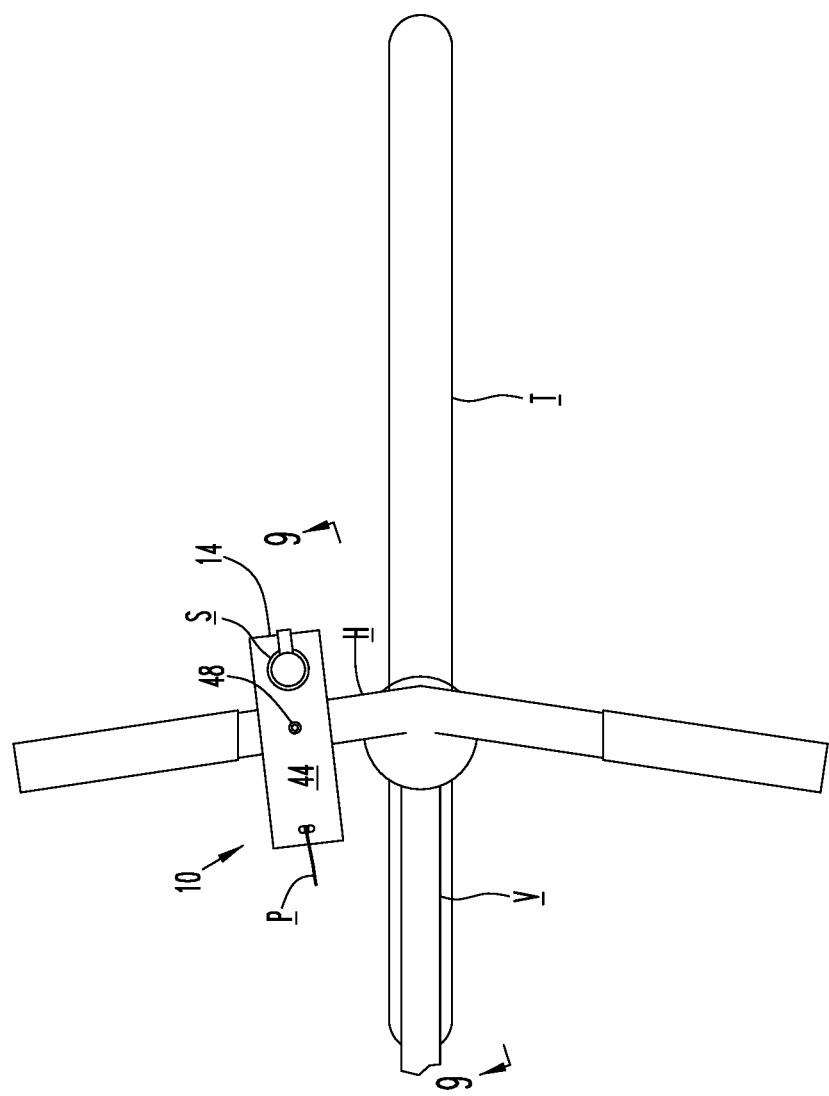

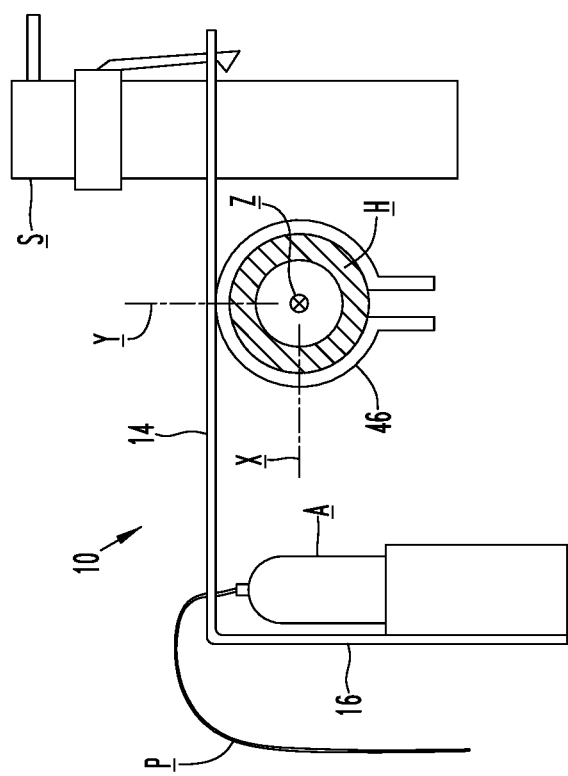

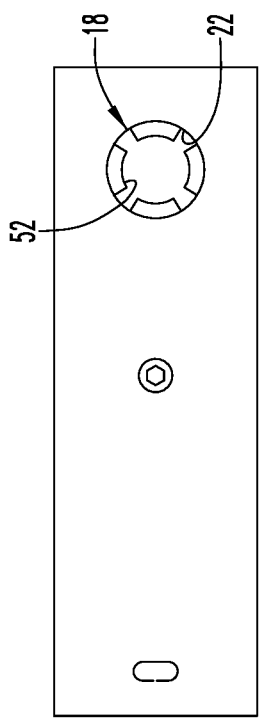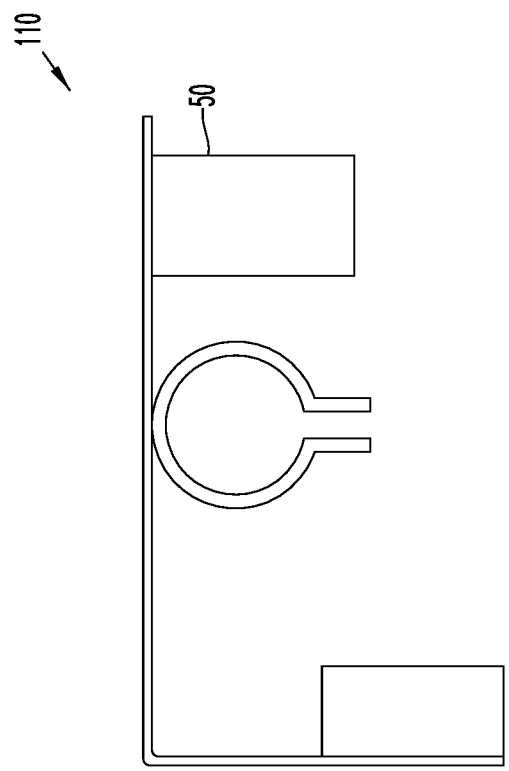

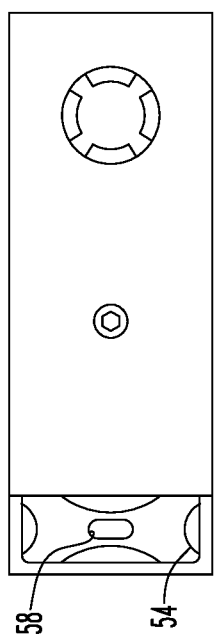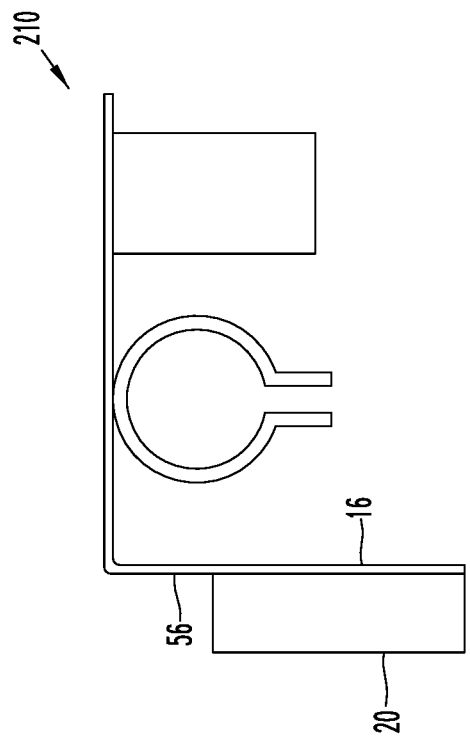

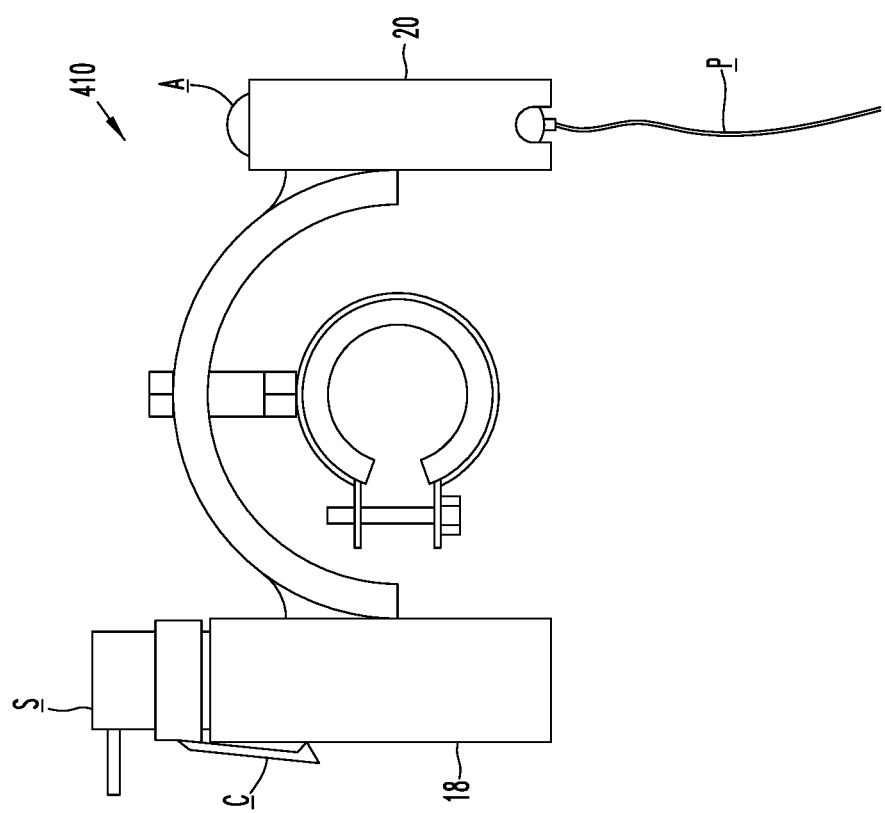

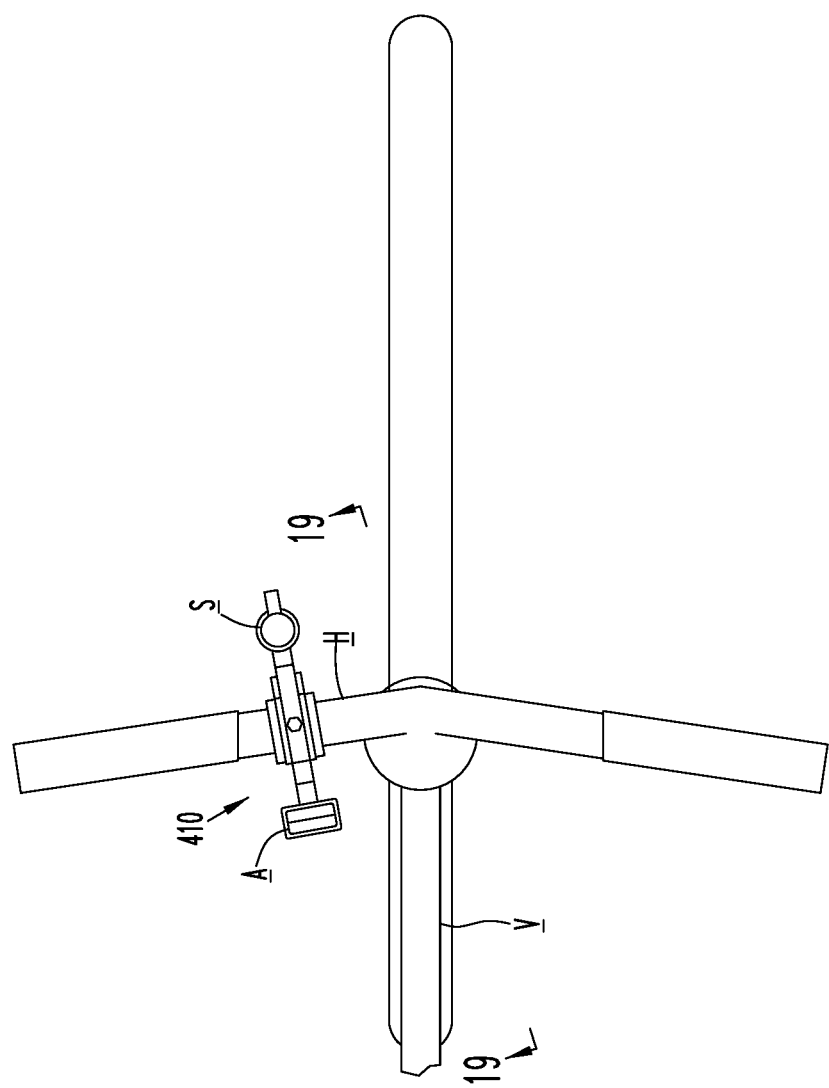

METHOD AND A DEVICE FOR PROTECTING A RIDER RIDING A BICYCLE FROM ATTACKS FROM AN ATTACKER

CROSS REFERENCE TO A RELATED APPLICATION

The present application is a non-provisional patent application claiming priority of a provisional U.S. application Ser. No. 63/009,584, filed on Apr. 13, 2020, which is incorporated by reference herein.

This application claims priority to and the benefit of the filing date of U.S. provisional patent application 63/009,584 filed Apr. 14, 2020 and entitled "A DEVICE FOR PROTECTING A BICYCLIST FROM ATTACKS BY PERSONS AND/OR ANIMALS WHILE THE BICYCLIST IS USING THE BICYCLE, AND A METHOD OF PROTECTING A BICYCLIST FROM ATTACKS BY PERSONS AND/OR ANIMALS WHILE THE BICYCLIST IS USING THE BICYCLE", which provisional application was on the filing date of this application and is incorporated by reference as if fully set forth herein.

BACKGROUND

1. Technical Field

This application generally relates to a method and a device for protecting a bicyclist from attacks by persons and/or animals while the bicyclist is riding the bicycle, and more particularly relates to a method and a device for protecting a bicyclist from attacks, wherein the device is able to hold safety equipment to repel the attacker, while the bicyclist is riding the bicycle.

2. Background Information

A list of documents for reference is as follows: U.S. Pat. Nos. 9,504,233, 8,493,194, 5,299,720, 5,170,658, 4,463,879, 4,334,642, 4,222,040, 1,222,458, 0,593,978. Currently, safety is an extremely worrying factor for population, be it inside residences, while moving on the streets and especially when driving vehicles especially bikes, motorbikes, trikes etc.

When driving bicycles on the streets, avenues, routes, hills, trekking paths etc. with high and/or jammed traffic, while stopping at traffic signs, while riding bikes on bike treks alone, in forest/hills etc., the riders of the bicycle lack protection, thus becoming easy targets for attackers, animals and thieves, sneaking and surprising the rider by not allowing the adoption of any evasive action.

Various devices are known in the art that may be carried by the rider to repel the attacker. However, none of the devices are available in the market that provides convenient usage of the safety equipment while riding the bicycle. Therefore, there is a need of a method and a device for protecting a bicyclist from attacks to repel the attacker while the bicyclist is riding the bicycle.

Steerable wheeled vehicles such as bicycles, tricycles, and motorcycles have a steerable wheel attached to a handlebar gripped by an operator for steering the vehicle. Such vehicles are ridden in a wide variety of environments, including urban and rural environments.

In both urban and rural environments, the operator is vulnerable to a number of different hazards. In urban environments population density is relatively high, and so the potential of human attackers may be high. Stray dogs and other urban wildlife are also present and so the potential of animal attack also exists. On the other hand, in rural environments population density is typically relatively low. But the likelihood of not being able to rely on assistance or help to fend off either a human or animal attacker is higher.

Personal protective devices are available to help defend against human and animal attacks. Such personal protective devices include, but are not limited to, pepper spray canisters and personal alarms that emit audio alarms using loud sirens.

Personal protective devices are typically not equally effective against all types of attackers. Some animals, for example, may not be initially deterred by pepper spray. Human attackers may not be initially deterred by an audio alarm.

Thus an operator should carry multiple types of personal protective devices to ward off different types of attackers.

But carrying multiple types of personal protective devices in one's pocket or bag may prevent quick access to the protective devices during an emergency.

Thus there is a need for a protective apparatus that can be attached to a steerable wheeled vehicle such as a bicycle, tricycle, or motorcycle that can carry a multiple number of preferably different personal protective devices. The protective apparatus should securely hold and retain the protective devices, while enabling quick access to or actuation of the protective devices. Many operators rent vehicles during a vacation or for weekend outings, and so the protective apparatus should be easily transferable between different vehicles even while holding the protective devices.

Object or Objects

A device and a method to protect a bicyclist.

SUMMARY

When bicyclists are using their bicycles, especially at high-speed they are vulnerable to animals or persons attacking them. An approach would be a method for scaring them off. This would include attaching a unit described herein to the handlebars, or alternatively, on other portions of a bicycle. Upon an attack, the bicyclist can energize a safety alarm device to startle and scare off a person and/or a very aggressive animal.

In an object of the embodiment a method for protecting a rider riding a bicycle from attacks from an attacker is provided. The method includes the steps of: attaching a safety device to the handlebar of the bicycle, mounting the safety device using the clamp unit to the handlebar of the bicycle; adjusting the safety device to a comfortable position; getting on the bicycle and riding the bicycle; being approached by the attacker, wherein the attacker is at least one of an animal; a bird; and a human; evaluating whether the attacker is a real attacker or not a real attacker; upon determining whether the attacker is the real attacker considering what to do; choosing at least one of the self-defense spray or the safety alarm device to repel of the attacker; and upon the self-defense spray or the safety alarm device not being effective using the other of said spray or siren as an additional protection.

In yet another object of the embodiment the safety device includes a bracket structure having a front end and a rear end extending away from the front end, a self-defense spray device detachably attached to the bracket structure at the front end, a safety alarm device detachably attached to the bracket structure on at the rear end, and a clamp unit disposed between the front end and the rear end and configured to be mounted on the handlebar, further the clamp unit is configured to securely hold the bracket structure on the handlebar.

The above discussed, and subsequently discussed, exemplifications of the present device will be described further herein below. When the word "exemplification" or "exemplification of the exemplification" is used in this specification, the word "exemplification" or "exemplification of the exemplification" includes "exemplifications" or "exemplifications of the exemplification", that is the pural of "exemplification" or "exemplification of the exemplification". By stating "exemplification" or "exemplification of the exemplification", the Applicant does not in any way admit that the present application does not include more than one patentably and non-obviously distinct exemplification, and maintains that this application may include more than one patentably and non-obviously distinct exemplification. The Applicant hereby asserts that the disclosure of this application may include more than one exemplification, and, in the event that there is more than one exemplification, that these exemplifications may be patentable and non-obvious one with respect to the other.

Disclosed is a protective apparatus and related method for protecting an operator (for example, a bicyclist) of a steerable wheeled vehicle from attack by persons and/or animals while operating the vehicle. The disclosed protective apparatus securely holds and retains a multiple number of personal protective devices while enabling the rider quick access to or actuation of the protective devices. Some embodiments of the disclosed protective apparatus are removably attachable to the vehicle and can be easily transferred between different vehicles without the need to remove the personal protective in devices from their holders.

A protective apparatus in accordance with this disclosure includes a clamp that attaches to a generally cylindrical portion of a member of the steerable wheeled vehicle such as a handlebar or frame member. For example, the clamp can be configured to attach to a bicycle handlebar or to a top tube or down tube of the frame of the bicycle. The clamp in turn extends along a longitudinal axis that is substantially coaxial with the longitudinal axis of the cylindrical portion when the clamp is attached to the cylindrical portion. For purposes of description, the clamp longitudinal axis is presumed to be perpendicular to the force of gravity. The term "horizontal" as used herein refers to a horizontal axis perpendicular to the clamp longitudinal axis and disposed in a horizontal plane perpendicular to the force of gravity. The term "vertical" and used herein refers to a vertical axis disposed in a vertical plane perpendicular to the horizontal plane and parallel with the force of gravity. The terms "above", "below", "up", and "down" and the like refer to vertical relationships. It is understood that these terms are used for convenience to describe a default configuration of the protective apparatus and relative positioning and directional aspects thereto. It is not intended that changes in orientation with respect to gravity of the longitudinal axis of the clamp when attached to the steerable wheeled vehicle or during operation or storage of the vehicle wheeled vehicle affect the accuracy of these terms in describing the structure of the disclosed protective apparatus.

A protective apparatus in accordance with this disclosure includes a clamp being releasably attachable to a portion of the cylindrical member of a steerable wheeled vehicle, the clamp having a longitudinal axis that extends axially along the cylindrical member portion when the clamp is attached to the cylindrical member. A bracket is attached to the outside of the clamp and is spaced vertically away from the clamp longitudinal axis.

The protective apparatus further includes first and second receptacles, each receptacle being carried by the bracket. The first and second brackets are spaced apart in opposite horizontal directions from the clamp whereby the receptacles are located on opposite sides of the cylindrical member when the clamp is attached to the cylindrical member.

Each of the first and second receptacles are configured and disposed to carry a respective personal protective device. Each personal protective device while being carried by the protective apparatus while attached to the vehicle is accessible to the operator for either removal from the apparatus or to actuate an actuator of the receptacle while the protective device is being carried in the receptacle.

Embodiments of the protective apparatus in accordance with this disclosure include an "L" shaped bracket having horizontal and vertical bracket sections. The first receptacle is carried by the horizontal bracket section and the second receptacle is carried by the vertical bracket section.

Other embodiments of the protective apparatus in accordance with this disclosure include the first and second receptacles being realized as respective containers attached to horizontally opposite ends of the bracket. The bracket in such embodiments may include a curved member that defines the ends of the bracket and is spaced vertically away from the clamp by a spacer. The curved member locates the containers generally in the horizontal plane of the clamp axis.

A method for protecting an operator of a steered wheel vehicle from attack by persons and/or animals while operating the steered wheel vehicle in accordance with this disclosure includes providing a number of personal protective devices being held by a bracket formed as a single member and attaching the bracket with the personal protective devices to the steered wheel vehicle wherein the personal protective devices are accessible to or can be actuated by the operator while the operator is operating the vehicle.

Other objects and features of the disclosure will become apparent as the description proceeds, especially when taken in conjunction with the accompanying drawing sheets illustrating multiple illustrative embodiments.

BRIEF DESCRIPTION OF THE DRAWINGS

FIG. 1 is a front view of a first embodiment protective apparatus in accordance with this disclosure.

FIG. 2 is a top view of the apparatus shown in FIG. 1.

FIG. 3 is a left-side view of the apparatus shown in FIG. 1 and taken along line 3-3 of FIG. 2.

FIGS. 4 and 5 are sectional views of the apparatus shown in FIG. 2 and taken along lines 4-4 and 5-5 respectively of FIG. 2.

FIG. 6 is similar to FIG. 1 but with the apparatus holding two protective devices.

FIG. 7 is a top view of the apparatus shown in FIG. 6,

FIG. 8 is a top view of the apparatus shown in FIG. 6 attached to the handlebars of a bicycle.

FIG. 9 is a sectional view taken along lines 8-8 of FIG. 8.

FIG. 10 is a front view of the apparatus shown in FIG. 1 but with the split-ring clamp attached below the bracket.

FIG. 11 is a front view of a second embodiment apparatus in accordance with this disclosure.

FIG. 12 is a top view of the apparatus shown in FIG. 11.

FIG. 13 is a front view of a third embodiment apparatus in accordance with this disclosure.

FIG. 17 is similar to FIG. 16 but with the apparatus holding two protective devices.

FIG. 18 is a top view of the apparatus shown in FIG. 17 attached to the handlebars of a bicycle.

DETAILED DESCRIPTION OF THE DRAWINGS

Figure 14:
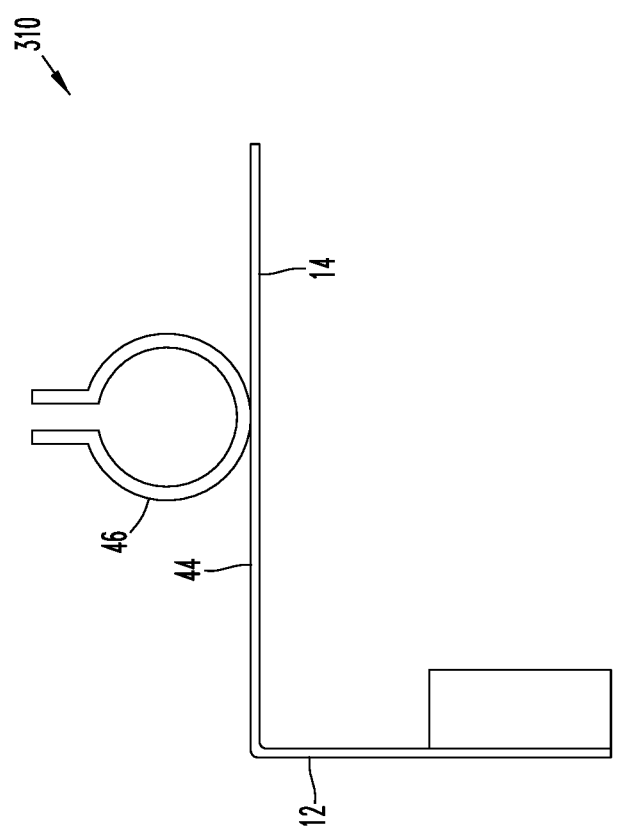
FIG. 14 is a top view of the apparatus shown in FIG. 13.

This patent application relates to a device for protecting a bicyclist from attacks by persons and/or animals while bicyclist is using the bicycle. The present application also relates to a method of protecting a bicyclist from attacks by persons and/or animals while the bicyclist is using the bicycle.

Detailed descriptions of various embodiments of the disclosed protective apparatus are described in relationship to use of the protective apparatus with a bicycle, it being understood the descriptions are applicable to other types of steerable wheeled vehicles as well, including tricycles, motorcycles, and the like.

FIGS. 1-5 illustrate a first embodiment protective apparatus 10 in accordance with this disclosure for protecting a bicyclist from attack by persons and/or animals while riding the bicycle.

The apparatus 10 includes an "L"-shaped bracket 12 that is configured to hold two different personal protective devices (see for example the two protective devices S and A shown in FIGS. 6 and 7). The bracket 12 includes a horizontal bracket section 14 that extends in this embodiment substantially perpendicularly to an upper end of a vertical bracket section 16. A first receptacle 18 is carried by the horizontal bracket section 14. A second receptacle 20 is carried by the vertical bracket section 16.

In this embodiment each of the first and second receptacles 18, 20 are configured to hold a specific type of personal protective device.

The first receptacle 18 is intended to hold a personal protective device being a canister having a cylindrical body holding pepper spray or the like, and including a clip for attaching the canister to clothing. An example of a canister with a cylindrical body and clip is the SABRE RED® MAXIMUM STRENGTH PEPPER SPRAY, SKU P-22-OC, available from Security Equipment Corporation, Fenton, Mo. 63026.

The first receptacle 18 is realized as a pair of through-holes, each through-hole extending between the upper and lower surfaces of the horizontal bracket section 14. The first through-hole 22 is circular and is sized to receive the body of the canister. The second, smaller through-hole 24 is spaced a short distance from the first through-hole 22. The smaller through-hole 24 is disposed to receive the canister clip of the canister held in the first through-hole 22.

The second receptacle 20 is intended to hold a personal protective device being a personal safety alarm that generates a very loud audio alarm via a siren. An example of such a personal safety alarm device is the RESQME® DEFENDME® personal safety alarm available from resqme, Inc., Santa Barbara, Calif. 93103.

The second receptacle 20 is realized as a container 20. The container 20 is attached to the lower end of the vertical bracket section 16. The container 20 extends vertically from an open upper end 26 to a closed lower end 28. The container 20 includes an interior wall 30 forming the three vertical sides and the bottom floor of the container. The interior wall 30 faces and defines an interior compartment or volume 32 of the container 20 in communication with the open upper end 26. The interior compartment 32 is sized to closely receive the personal safety alarm.

The second receptacle 20 is attached to the inner surface 34 of the vertical bracket section. The horizontal bracket section 14 is vertically spaced away from the container upper end 26 but extends over the upper end 20. The horizontal bracket section 14, however, may prevent or obstruct insertion of the personal safety alarm into the container from the container's open upper end 26.

The container 20 is made removably attachable to the vertical bracket section 16. In the illustrated embodiment a pair of screws 36a, 36b extend through the vertical bracket section 16 and into the compartment 20. Unscrewing the screws and removing the container 20 from the vertical bracket section 16 enables the bicyclist to insert and remove the personal safety alarm directly into or out of the compartment 32. The personal safety alarm does have to be inserted or removed through the container's upper end 26. When the container 20 is re-attached against the bracket inner surface 34, the inner surface 34 cooperates with the container 20 to surround the internal volume 32.

The personal safety alarm includes an audio speaker located along one side of the alarm. When the alarm is in the container 20, the speaker may face the bracket inner surface 34 or may face the container wall 30. To not muffle the siren, a through-hole 38 extending through the vertical bracket surface 34 and a corresponding through-hole 40 extending through the container wall 30 are aligned with one another when the container is attached to the vertical bracket section. The holes 38, 40 are positioned so that one of the holes 38, 40 is located over the speaker when the personal safety alarm is held in the container 20.

The personal safety alarm includes an actuator on an end of the alarm. A pull cord extends from the actuator and away from the alarm. Pulling on the cord actuates the alarm and sets off the siren. The horizontal bracket section 14 includes a cord through-hole 42 centered over the open upper end 26 of the second container 20. The cord through-hole 42 enables the cord extending from the personal safety alarm in the container 20 to extend through the hole 42 and be accessible to the bicyclist from the upper side 44 of the horizontal bracket section 14.

In other possible embodiments of the apparatus 10, the cord through-hole 38 may be sized to enable a personal safety alarm to pass through the hole 38 for insertion into or out of the container 20 without the need to remove the container 20 from the vertical bracket section 16.

The bracket 12 is removably attachable to the bicycle handlebars by a clamp 46. The illustrated clamp 46 is a split-ring clamp that extends along a longitudinal axis Z perpendicular to the drawing sheet as viewed in FIG. 1. The ring clamp 46 receives the handlebar of the bicycle to mount the protective apparatus at a desired mounting location on the handlebar as will be described in more detail below. Once the handlebar is received in the clamp, a screw (not shown) tightens the split-ring clamp around the handlebar for a secure frictional fit between the clamp and the handlebar.

The clamp 46 is removably attached to the horizontal bracket section 14 by a screw 48. The screw 48 can be tightened from the bracket upper side 44. The clamp 46 is horizontally spaced between the receptacles 18, 20. The clamp 46 is spaced sufficiently from the receptacles 18, 20 to not interfere with nor obstruct insertion and removal of the protective devices held in the receptacles. The screw 48 may not necessarily be centered between the receptacles 18, 20; the screw may be positioned such that the screw is not exposed to a substantial imbalanced load generated by the weight of the protective devices and bracket.

FIGS. 6 and 7 illustrate the apparatus 10 holding two personal protective devices S and A.

Device S is held in the first receptacle 18. The device S is a canister of SABRE RED® MAXIMUM STRENGTH PEPPER SPRAY. The device S includes a canister body B and a clip C. The canister body B was inserted into the receptacle 18 from the upper side 44 of the horizontal bracket section 14. The canister body B is received in the bracket through-hole 20 and the clip C is received in the bracket through-hole 22. The clip C is elastically deflected from the canister body B and applies a spring force to the bracket 12 that assists in retaining the protective device S in the receptacle 18.

Device A is held in the second receptacle 20. The device A is a RESQME® DEFENDME® personal safety alarm. The device A includes an actuator at one end of the alarm, and a pull cord P attached to the actuator. The pull cord P extends from the actuator and through the bracket cord through-hole 42. As shown in FIG. 6, the device A was placed in the receptacle container 20 with its audio speaker facing the container through-hole 38 (as indicated by the sound waves W that would issue from the alarm when in use).

As can be seen in FIG. 7, the device S is accessible from the upper side 44 of the horizontal bracket section 14 for quick removal by the bicyclist in case of emergency. Likewise, the pull cord P is accessible from the upper side 44 of the horizontal bracket section 16 to quickly actuate the device A in case of emergency.

FIGS. 8 and 9 illustrate the apparatus 10 holding the personal protective devices S and A, the apparatus 10 being mounted on the handlebar H of a bicycle V having a front tire T The apparatus clamp 46 can be removed from the bracket 10 if desired for installing the clamp on the handlebar H. Alternatively, the clamp 46 can remain attached to the bracket 12 during installation. If loosely held by the screw during installation, the clamp can rotate about the screw relative to the bracket 12 to position the clamp to receive the handlebar, and then the bracket 12 is repositioned with respect to the clamp before tightening the screw to complete installation.

As best seen in FIG. 9, the apparatus split-ring clamp 46 receives the handlebar H into the split-ring. The split-ring clamp 46 is tightened to form a reliable friction fit between the clamp 46 and the portion of the handlebar H received in the clamp 46. The friction fit resists displacement of the bracket 10 about the handlebar H.

With the apparatus 10 attached to the handlebar, the longitudinal axis Z of the clamp 46 extends along the handlebar portion. The longitudinal axis Z defines a vertical axis Y perpendicular to the longitudinal axis and a horizontal axis X as previously described.

The clamp 46 places the horizontal bracket section 14 of the bracket 10 vertically above the handlebar H. The horizontal bracket section 14 is generally aligned horizontally and extends along the horizontal axis X. The vertical bracket section 16 is generally aligned vertically and extends along the vertical axis Y. The receptacles 18, 20 are disposed horizontally on opposite sides of the handlebar H and are spaced away from the handlebar H. The screw 48 can be loosened to permit limited adjustment of the horizontal orientation of the bracket 10 on the handlebar H.

As best seen in FIG. 8, the bicyclist, when riding the bicycle V, has access to the pepper spray device S and to the pull cord P of the personal safety alarm A.

The apparatus 10 is shown in FIGS. 8 and 9 mounted on the left handlebar and with the vertical bracket section 16 on the same side of the handlebar H as the bicyclist. The bicyclist can choose to mount the apparatus 10 on the right handlebar instead. Right-handed bicyclists may prefer mounting the apparatus 10 on the right handlebar, left-handed bicyclists on the left handlebar.

Depending on the types of personal protective devices held by the bracket 12, a bicyclist may also choose to mount the apparatus 10 with the vertical bracket section 16 on the opposite side of the handlebar H if there is clearance for the vertical bracket section 16 and the vertical bracket section 16 does not interfere with steering or other operation of the bicycle.

FIGS. 10 and 11 illustrate a second embodiment apparatus 110 in accordance with this disclosure. The apparatus 110 is similar to the apparatus 10 and so only the differences will be discussed, and the same reference numbers will refer to corresponding elements.

The first receptacle 18 in this second embodiment protective apparatus 110 is configured to receive the cylindrical body B of the protective device S through the through-hole 22. The illustrated embodiment does not include the clip through-hole 24 of the apparatus 10 (but it could be provided as well). The first receptacle 18 further includes a cup-like container 50 disposed beneath the through-hole 22 to receive and support the body B. Four, like circumferentially spaced flexible fingers 52 extend into the container 50 to help secure protective devices having smaller-diameter canisters.

FIGS. 12 and 13 illustrate a third embodiment apparatus 210 in accordance with this disclosure. The apparatus 210 is similar to the apparatus 110 and so only the differences will be discussed, and the same reference numbers will refer to corresponding elements.

In this third embodiment the second receptacle 20 is similar to the second receptacle container 20 of the apparatus 10. The protective apparatus 110 further includes opposing pairs of flexible fingers 54 extending into the container 20. The container 20, however, is located on the outer side 56 of the vertical bracket section 16. This enables insertion and removal of a personal safety alarm A from the container 20 without obstruction by the horizontal bracket section 14. A pull cord P can extend from the upper end of the container 20, enabling elimination of the cord through-hole 42 of the apparatus 10 in this embodiment.

The container 20 further includes a bottom through-hole 58 that can serve as a drain hole. The bottom through-hole 58 further enables a personal safety alarm A to be placed actuator-end down in the container 20, with the pull cord P extending through the bottom through-hole 58 for access to the bicyclist.

FIG. 14 illustrates a fourth embodiment apparatus 310 in accordance with this disclosure. The apparatus 310 is similar to the apparatus 10 and so only the differences will be discussed, and the same reference numbers will refer to corresponding elements. The split-ring clamp 46 is attached to the upper side 44 of the horizontal bracket section 14. This places the bracket 12 below the handlebar H when mounted on the handlebar. For some configurations of bicycle handlebar and bicycle stem, placing the bracket 12 below the handlebar may be preferred by some bicyclists.

The bracket 12 shown in FIGS. 1 and 14 in possible embodiments can be configured to enable a screw 48 to be inserted from either the top and bottom sides of the horizontal bracket section 14 to selectively mount the clamp 46 on the top side of the horizontal bracket section 14 as in the apparatus 310 or on the bottom side of the horizontal bracket section 14 as in the apparatus 10.

Figure 16:
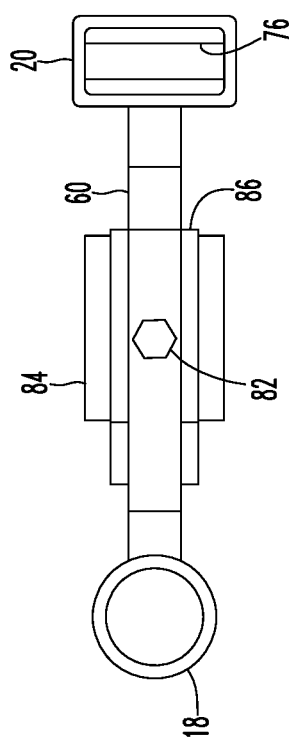
FIG. 16 is a top view of the apparatus shown in FIG. 15.
Figure 15:
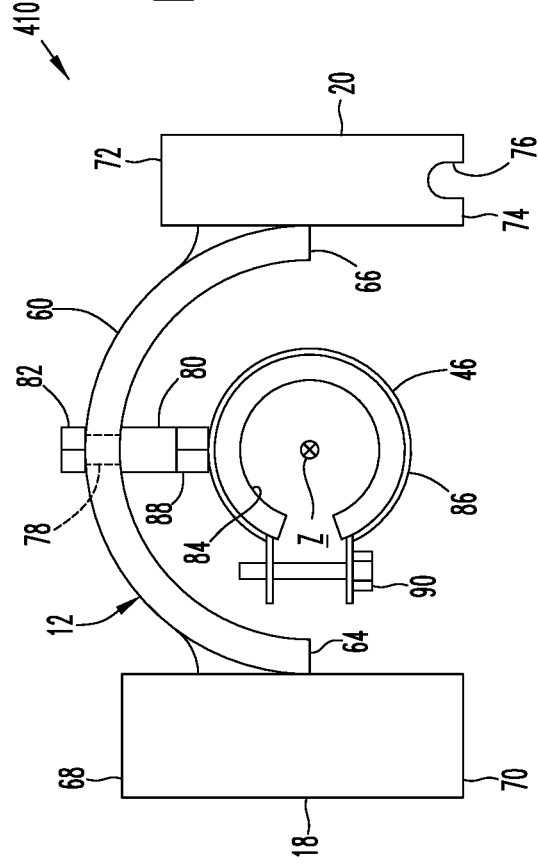
FIG. 15 is a front view of a fourth embodiment apparatus in accordance with this disclosure.

FIGS. 15 and 16 illustrate a fifth embodiment apparatus 410 in accordance with this disclosure. The same reference numbers used in describing with the apparatus 10 will refer to corresponding elements of the apparatus 410.

In this fifth embodiment apparatus, the bracket 12 includes a generally semi-circular member 60 that extends around an axis that is co-axial with the clamp longitudinal axis Z. The bracket member 60 extends circumferentially to a left end 64 and an opposite right end 66 as viewed in FIG. 15.

The first receptacle 18 is realized as a container 18 that is permanently attached to the radially outer surface of the bracket member left end 64. The container 18 is configured to receive and retain the spray device S previously described. The container 18 has a tubular body that extends from an open upper end 68 vertically spaced above the bracket left end 64 to a closed bottom end 70 spaced below the bracket left end 64. A drain hole (not shown) in embodiments of the container 18 can extend through the closed bottom end 70.

The second receptacle 20 is realized as a container 20 permanently attached to the radially outer surface of the bracket member right end 66. The container 20 is similar to the container 20 of the second apparatus 110. The container 20 is formed as a generally rectangular tubular body that extends from an open upper end 72 vertically spaced above the bracket right end 66 to a closed bottom end 74 spaced below the bracket right end 66. A bottom through-slot 76 extends through the bottom end 74 parallel with the axis Z and serves essentially the same function of the bottom through-hole 58 of the container 20 of the third embodiment apparatus 210.

The bracket semi-circular member 60 further includes a centered radially-aligned through-hole 78. A spacer realized as a tubular sleeve 80 aligned with the through-hole 77 extends downwardly from the semi-circular member towards the axis 62. The sleeve receives a cap screw 82 inserted from the outside of the semi-circular member that removably attaches the semi-circular member 60 to a clamp 46.

The clamp 46 of the protective apparatus 410 is realized as a cushioned pipe clamp that functions similarly to the split-ring clamp 46 of the first embodiment apparatus 10. The pipe clamp 46 includes an arcuate rubber sleeve 84 contained within a steel clamp ring 86. The pipe clamp 46 includes a cap nut 88 fixed to the clamp ring 86 for receiving the cap bolt 82 and a screw 90 that tightens the pipe clamp on the handlebar after the handlebar is received in the pipe clamp. A cushioned pipe clamp that can be adapted for use as the pipe clamp 46 is the CADDY® SUPERFIX® 454 cushioned pipe clamp available from Erico International Corporation, Solon Ohio 44139.

FIG. 17 illustrates the apparatus 410 holding the two personal protective devices S and A.

Device S is held in the first container 18 and extends outwardly from the container's upper end 68. The canister body B is received in the first container 18. The clip C is located outside of the container 18. The wall of the first container 18 is received between the clip C and the canister body B, elastically deflecting the clip and thereby urging the clip against the first container 18.

Device A is held in the second container 20. The device A is shown placed actuator-end down in the container 20. The pull cord P extends through the bottom slot 76.

Figure 19:
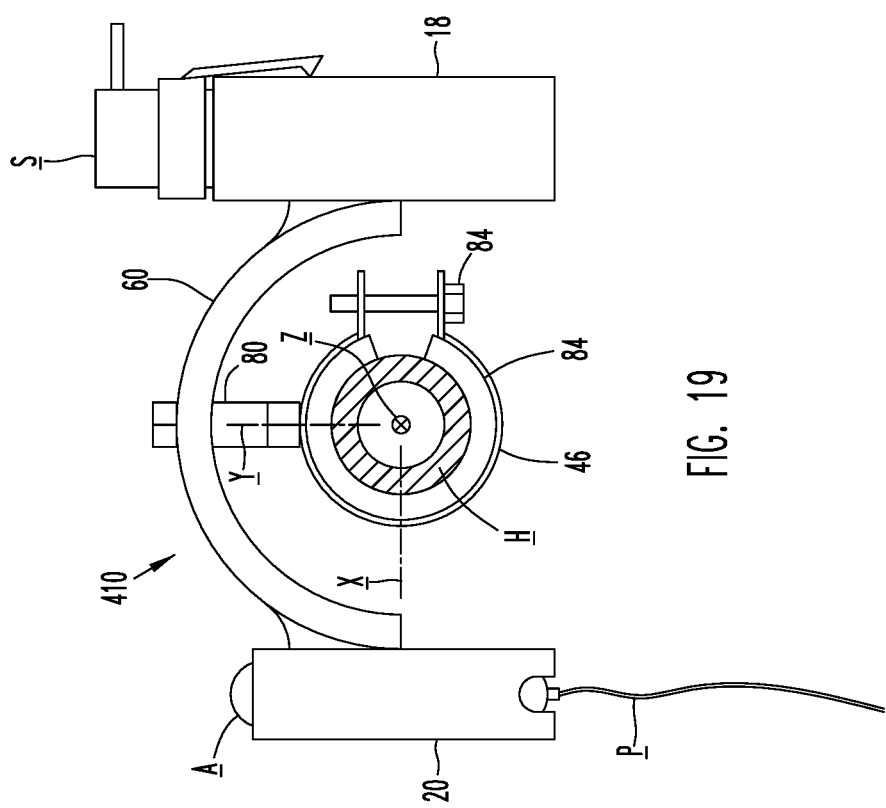
FIG. 19 is a sectional view taken along line 19-19 of FIG. 18.

FIGS. 18 and 19 illustrate the apparatus 410 holding the personal protective devices S and A, the apparatus 10 being mounted on the handlebar H of the bicycle V shown in FIG. 8. The clamp 46 mounts the apparatus 10 to the handlebar H as previously described with relation to the split-ring clamp 46. The clamp rubber sleeve 84 is compressed against the handlebar H by the screw 90 to form a reliable friction fit between the clamp 46 and the handlebar H. The bracket sleeve 80 extends vertically upwardly away from the clamp 46 and spaces the bracket semi-circular member 60 above the handlebar H. The gap between the bracket semi-circular member 60 and the handlebar H may make for easier installation of the apparatus 10 in accommodating brake cables or the like extending along the handlebar The bracket semi-circular member 60 extends from the upper end of the bracket sleeve 80 vertically downwardly and horizontally outwardly with respect to the handlebar H to the first and second receptacle containers 18, 20. The bracket semi-circular member 60 locates the first receptacle container 18 and the second receptacle container 20 on opposite sides of the handlebar H and locates both containers 18, 20 in the same horizontal plane defined by the clamp axis Z.

Figure 20:
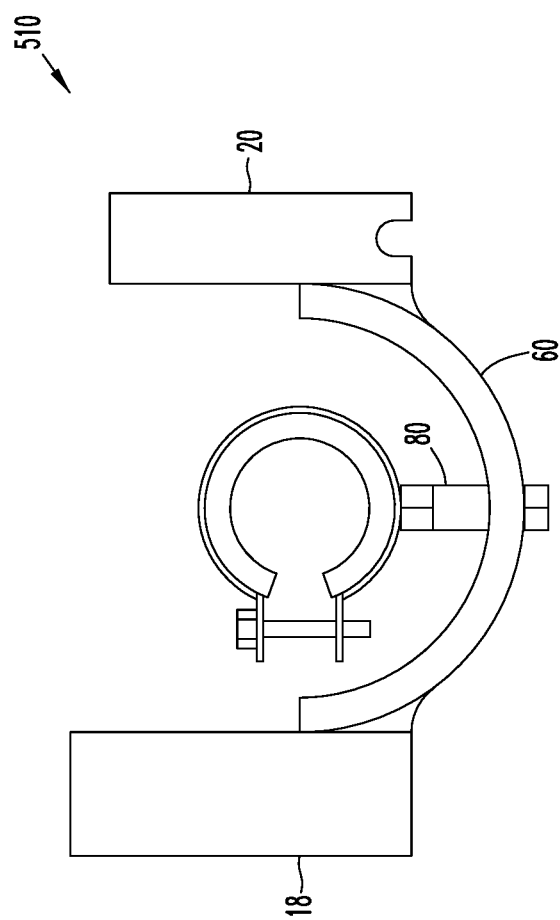
FIG. 20 is a front view of a fifth embodiment apparatus in accordance with this disclosure.

FIG. 20 illustrate a sixth embodiment apparatus 510 in accordance with this disclosure. The same reference numbers used in describing with the apparatus 510 will refer to corresponding elements of the apparatus 410.

The apparatus 510 is similar to the apparatus 410 but the bracket sleeve 80 extends vertically downwardly from the clamp 46. The bracket sleeve 78 spaces the bracket semi-circular member 60 below the handlebar H. If desired, the first receptacle container 18 and the second receptacle container 20 may each be removably attached to the bracket semi-circular member 60 for orientation as viewed in FIG. 15 or as viewed in FIG. 20 to enable the bicyclist the option of having the bracket semi-circular member 60 mounted above the handlebar H or below the handlebar H.

Figure 21:
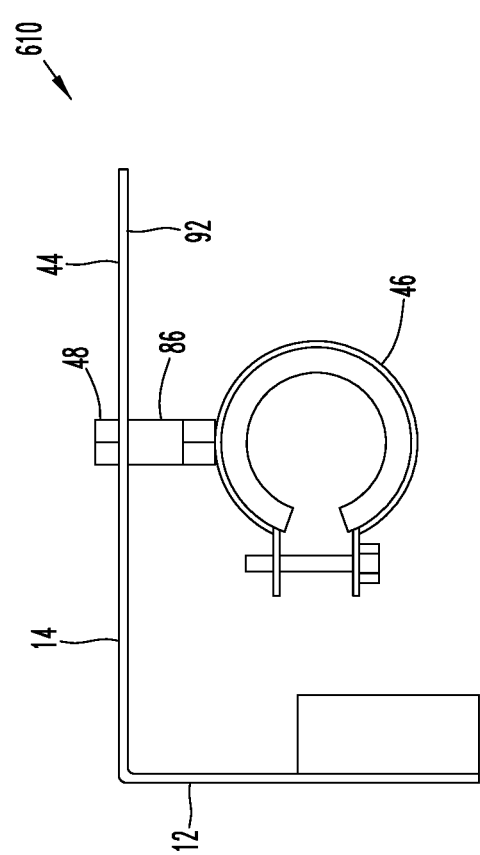
FIG. 21 is a front view of a sixth embodiment apparatus in accordance with this disclosure.

FIG. 21 illustrates a seventh embodiment apparatus 610 in accordance with this disclosure. The same reference numbers used in describing the apparatus 610 will refer to corresponding elements of the first embodiment apparatus 10 and the sixth embodiment apparatus 510.

The apparatus 710 is similar to the apparatus 10. The split-ring clamp 46 of the apparatus 10 is replaced with the pipe clamp 46 of the fifth embodiment apparatus 410, and the screw 48 is replaced with a cap screw 48. The cap screw 48 extends through a spacer realized as a tubular sleeve 86. In FIG. 21 the sleeve 86 extends upwardly from the pipe clamp 46 to the bottom side 92 of the bracket horizontal section 14 to space the bracket 12 vertically above and away from the pipe clamp 46. A bicyclist could instead choose to insert the cap screw 48 from the upper side 44 of the horizontal bracket section and through the sleeve 86 to space the bracket 12 vertically below and away from the pipe clamp 46.

Additional reference information is disclosed in U.S. Pat. Nos. 9,504,233, 8,493,194, 5,299,720, 5,170,658, 4,463,879, 4,334,642, 4,222,040, 1,222,458, and 0,593,978, each of which are incorporated by reference as if fully set forth herein.

Figure 22:
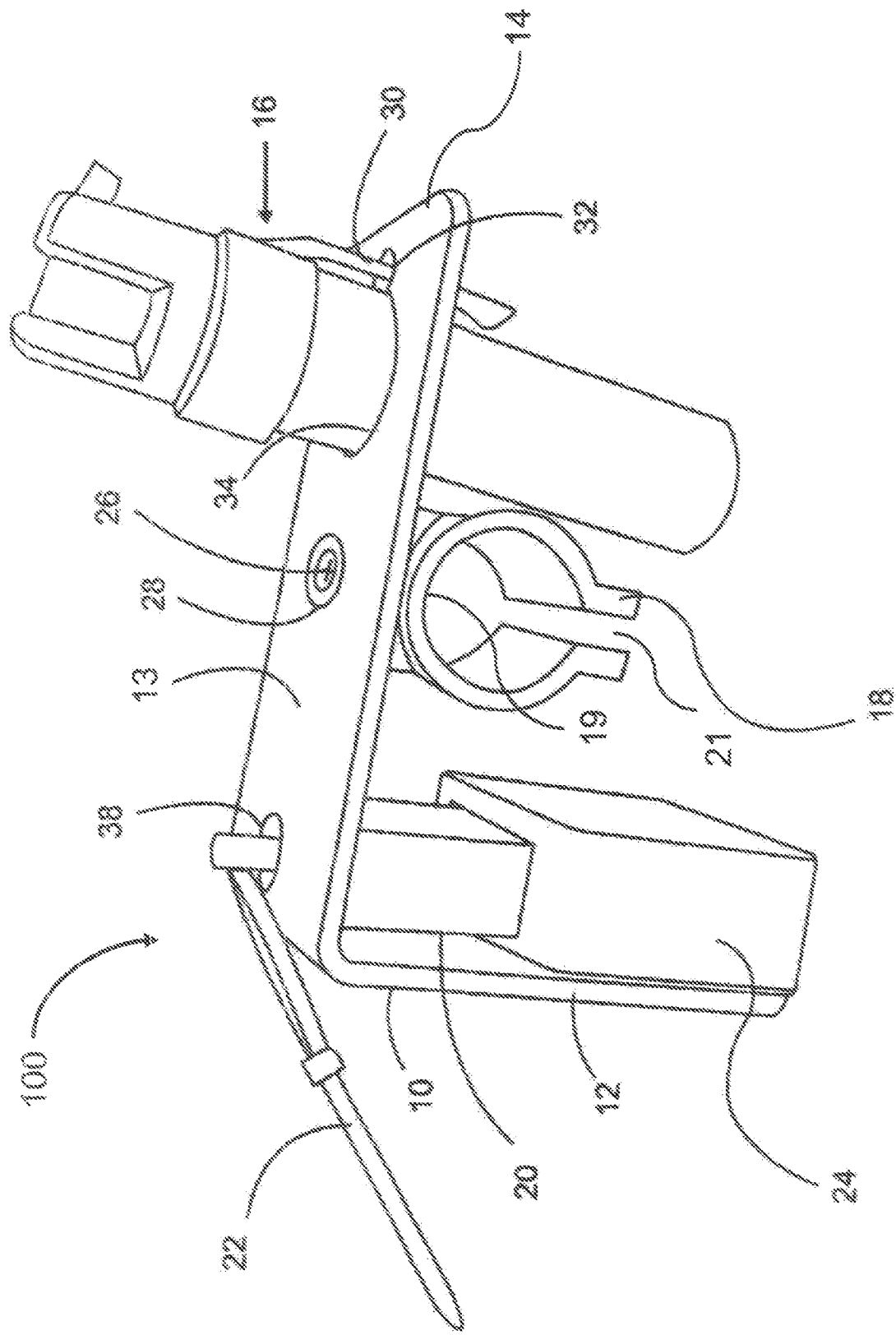
FIG. 22 illustrates a perspective view of a safety device in accordance with an embodiment of the present exemplification.

FIG. 22 illustrates a perspective view of a safety device 100 in accordance with an embodiment of the present exemplification. The safety device 100 protects a rider riding a bicycle from attacks from an attacker. Generally, each bicycle contains a handlebar. The safety device includes a bracket structure 10, a first hole 34, a second hole 32, a self-defense spray 16, a clip 30, a third hole 30, a safety alarm device 38, a clamp unit 18, a fourth hole 28, and a screw 26.

The bracket structure 10 is having a front end 14, a rear end 12 extending away from the front end 14 and a central portion 13 forming a bracket body between the front end 14 and the rear end 12. The bracket structure 10 may be made up of various material including but not limited to a metal, plastic, wood, glass, ceramics, and composites etc.

It would be readily apparent to those skilled in the art that various shapes such as L-shape, semi-circular shape, cylindrical shape rod etc. of the bracket structure 10 may be envisioned without deviating from the scope of the present exemplification. The self-defense spray device 16 is detachably attached to the bracket structure at the rear end 12 in the first hole 34. The second hole 32 is disposed adjacent to the first hole 30. The clip 30 is configured to attach to the self-defense spray device 16 passes through the second hole 32.

Examples of the self-defense spray device 16 include but not limited to a pepper spray, chili spray, chili foam spray etc. The clip 30 allows the rider to carry the self-defense spray 16 either in pocket, belt, hooks etc. i.e. within the reach of fingers. The second hole 32 is configured to facilitate the clip 30 of the self-defense spray device 16 on the bicycle. Examples of the clip 30 include but not limited to a key-chain, loop, tactical metal duty Clips etc.

The safety alarm device 20 is detachably mounted to the bracket structure 10 in the third hole 38. The rider on evaluating a threat from an attacker may use either a self-defense spray 16 or a safety alarm device 20 to deter/repel/scare of the attacker. In another embodiment of the present exemplification, the safety alarm device 20 includes a siren, and an activation unit 22 to energize the siren of the safety alarm device 20.

Examples of the activation unit 22 include but not limited to a loop, key-chain, hooks etc. It would be readily apparent to those skilled in the art that various forms of the safety alarm device 20 such as alarms with sounds, alarms with GPS tracking, alarms with communication network etc. may be envisioned without deviating from the scope of the present exemplification.

The clamp unit 18 is disposed between the front end 14 and the rear end 12. Further, the clam unit 18 is configured to be mounted on the handlebar and to securely hold the bracket structure 10 on the handlebar. The clamp unit 18 is a C-shaped unit having a clamping slot 19 and an entrance 21 communicating with the clamping slot 19. The clamping slot 19 is adapted to clamp the handlebar via the entrance 21.

The entrance 21 may be locked to restrict the movement of the handlebar in the clamping slot 19. Various attachment units such as screws, bolts, spring mechanisms, nuts etc. may be used to lock the entrance 21. The fourth hole 28 is disposed on the central portion 13 of the bracket structure 10 between the first hole 34 and the third hole 38. The screw 26 is passing through the fourth hole 28 configured to attach the clamp unit 18 onto the bracket structure 10.

It would be readily apparent to those skilled in the art that various shapes, sizes and materials of the clamp unit 18 and the screw 26 may be envisioned without deviating from the scope of the present exemplification. In another embodiment of the present exemplification, the safety device 100 further includes a box assembly 24. The box assembly 24 is explained in detail in conjunction with FIG. 23 of the present exemplification.

Figure 23:
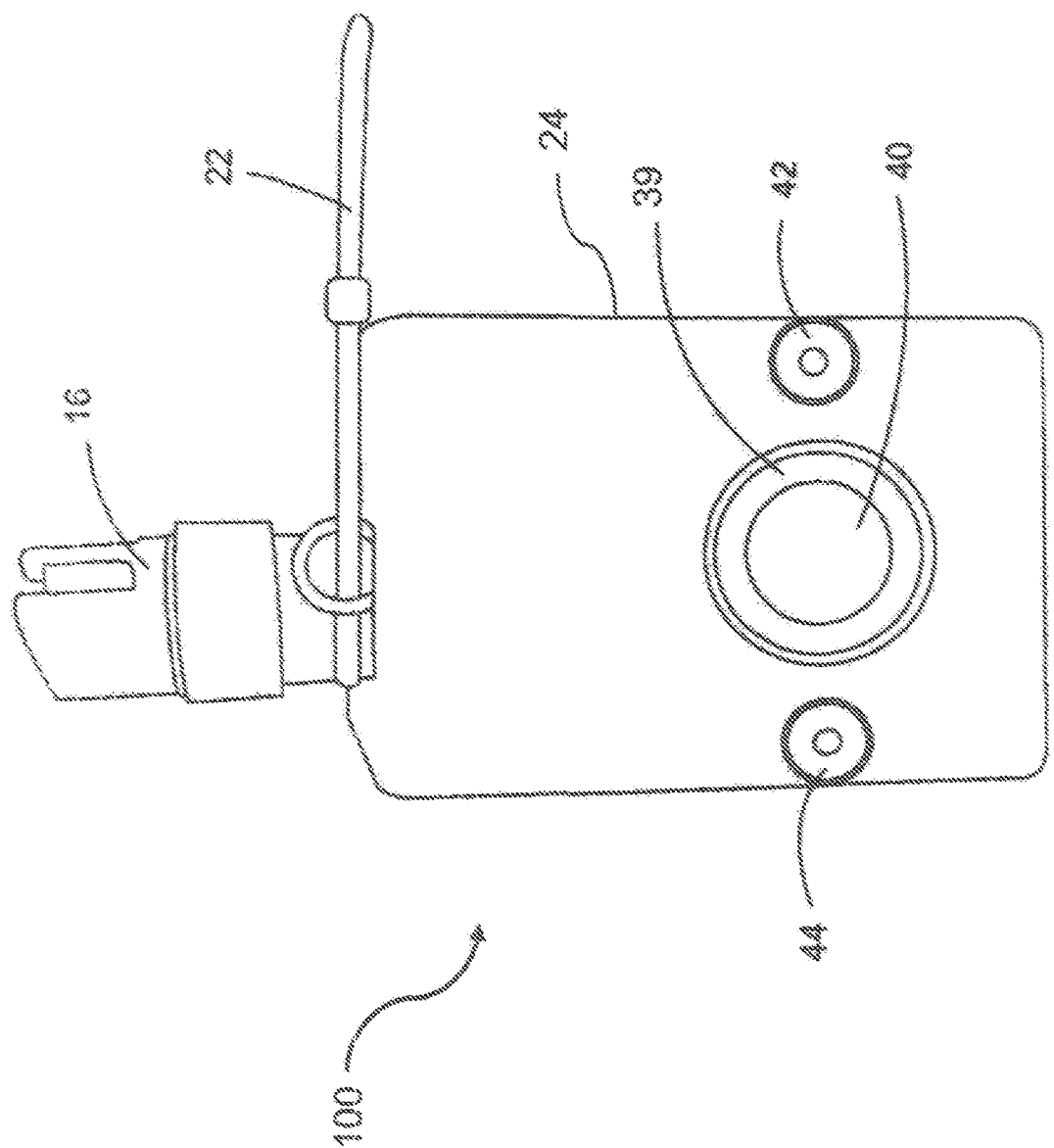
FIG. 23 illustrates a perspective side view of a safety alarm device in accordance with an exemplary embodiment of the present exemplification.

FIG. 23 illustrates a perspective side view of the safety alarm device 20 in accordance with another embodiment of the present exemplification. The safety device 100 further includes a box assembly 24 to hold the safety alarm device 20, and an attachment unit 42, 44 to attach the box assembly 24 to the bracket structure (10, shown in FIG. 22) on the rear end (12 shown in FIG. 22).

Examples of the attachment unit 42,44 include but not limited to a nuts, screw, bolts, nails, and other similar attachment devices to attach the box assembly 24 to the bracket structure. In another embodiment of the present exemplification, the safety device 100 further includes a fifth hole 39 is disposed in the box assembly 24 and a speaker 40 is disposed in the fifth hole 39 for releasing the audio signals to scare of the attacker.

Figure 24:
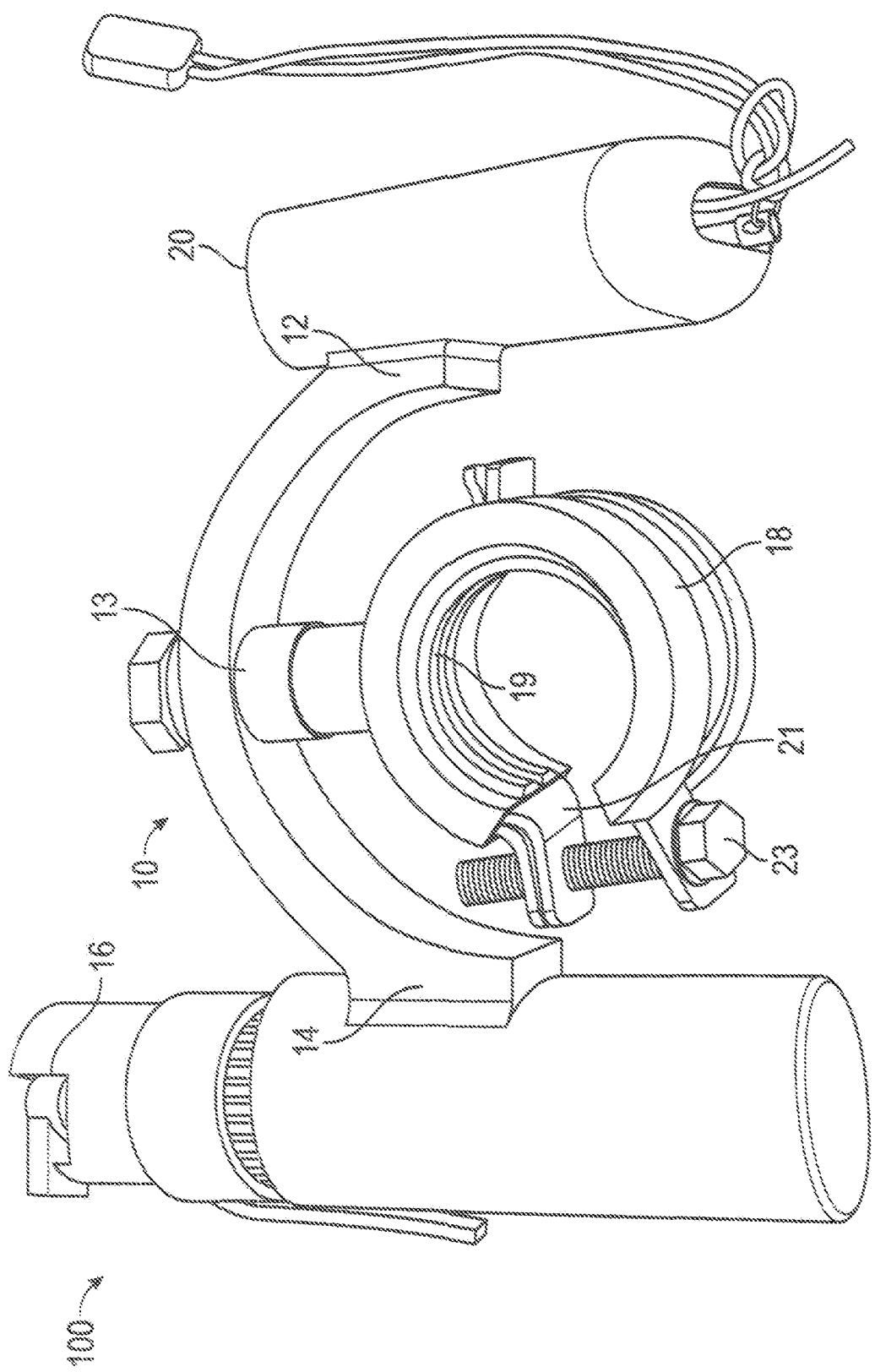
FIG. 24 illustrates a perspective view of a safety device in accordance with another embodiment of the present exemplification.

FIG. 24 illustrates a perspective view of a safety device 100 in accordance with another embodiment of the present exemplification. The safety device 100 is shown with a bracket structure 10 having a front end 14, a rear end 12 and a central portion 13. The self-defense spray device 16 is attached at the front end 14, the safety alarm device 20 is attached at the rear end 12 and the clamp unit 18 is attached at the central portion 13.

The bracket structure 10 is configured in a semi-circular shape. The safety device 100 further includes an attachment unit 23 to lock the opening of the entrance 21 to maintain the position of the handlebar within the clamping slot 19. Examples of the attachment unit 23 include but not limited to screw, nuts, bolts, spring mechanism etc.

The clamp unit 18 is made up of flexible/stretchable rubber material, which has a flexible/stretchable entrance 21 to allow handlebar of various sizes to adjust accordingly within the clamping slot 19. The entrance 21 may be open from 20 degrees to 100 degrees, depending upon the rider's requirement and of the handlebar size. Further, an opening for receiving the attachment unit 23 is provided on each end of the C-shaped clamp unit 18. The attachment unit 23 (nut and bolt) is then made to pass through the openings to lock the entrance 21.

Figure 25:
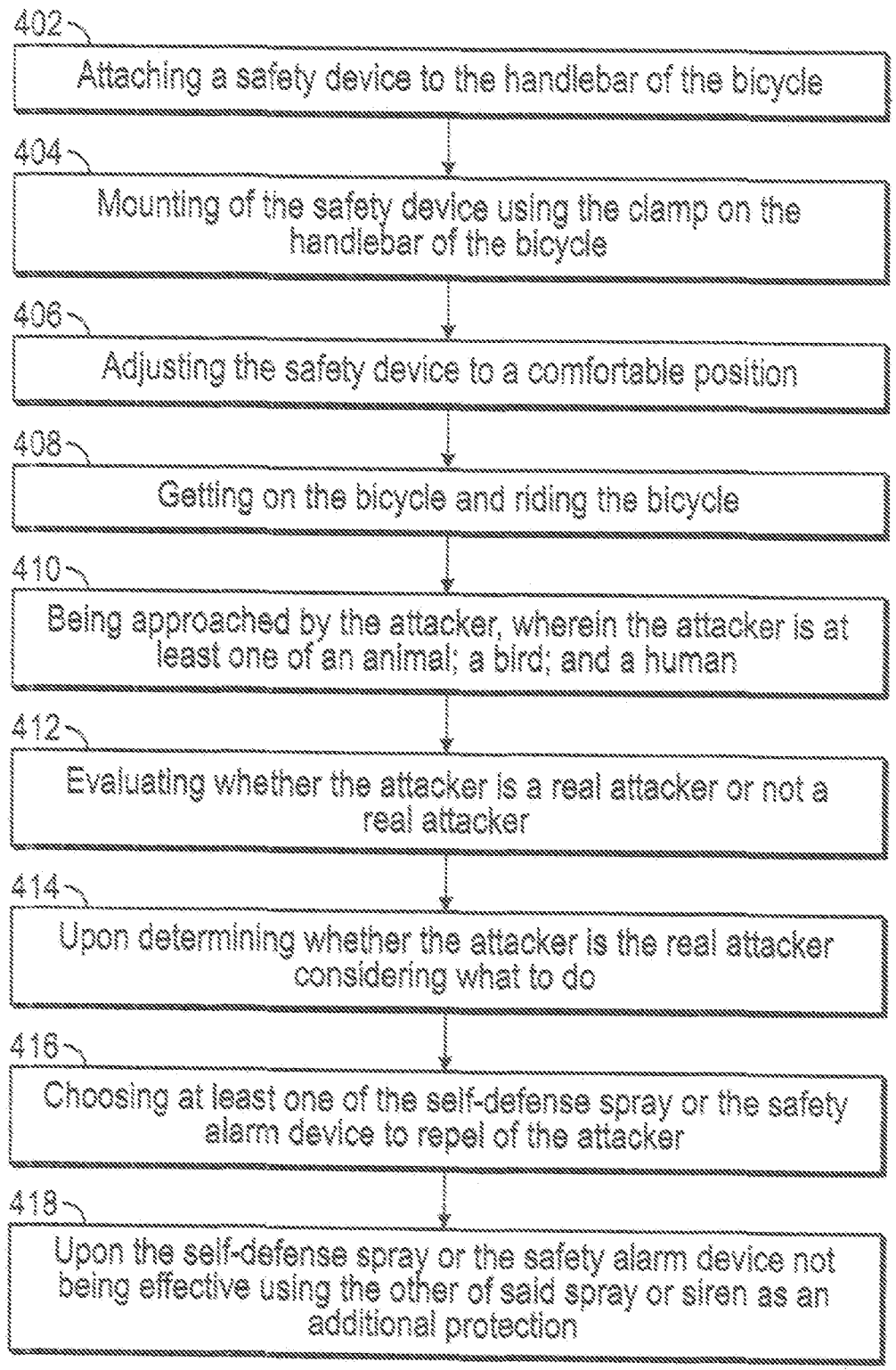
FIG. 25 illustrates a flowchart of a method for protecting a rider riding a bicycle from attacks from an attacker.

FIG. 25 illustrates a flowchart of a method 400 for protecting a rider riding a bicycle from attacks from an attacker. The method 400 initiates with a step 402 of attaching a safety device to the handlebar of the bicycle, followed by a step 404 of mounting of the safety device (100 shown in FIG. 22, FIG. 23 and FIG. 24) using the clamp unit (18 shown in FIG. 22 and FIG. 24) on the handlebar of the bicycle, followed by a step 406 of adjusting the safety device to a comfortable position, followed by a step 408 of getting on the bicycle and riding the bicycle.

Further the step 408 is followed by a step 410 of being approached by the attacker, wherein the attacker is at least one of an animal; a bird; and a human, followed by a step 412 of evaluating whether the attacker is a real attacker or not a real attacker, followed by a step 414 of upon determining whether the attacker is the real attacker considering what to do.

Further, the step 414 is followed by a step 416 of choosing at least one of the self-defense spray (16 shown in FIG. 22, FIG. 23 and FIG. 24) or the safety alarm device (20 shown in FIG. 22 and FIG. 23) to repel of the attacker, followed by a step 418 of upon the self-defense spray or the safety alarm device not being effective using the other of said spray or siren as an additional protection.

In another embodiment of the present exemplification, a method for protecting a rider riding a vehicle from attacks from an attacker, the vehicle having a handlebar. The method includes a step of: attaching a safety device to the handlebar of the vehicle wherein the safety device includes: a bracket-like structure having a front end and a rear end; a self-defense spray device detachably attached to the bracket-like structure on the front end; a safety alarm device detachably attached to the bracket-like structure on the rear end; and a clamp unit configured between the front end and the rear end mounted on the handlebar, further the clamp unit securely holds the bracket-like structure on the handlebar. The method further includes a step of operating the self-defense spray to release a spray to repel of the attacker; and operating the safety alarm device to release audio signals to scare off the attacker.

In another embodiment of the present exemplification a safety device for protecting a rider riding a vehicle from attacks from an attacker. The vehicle is having a handlebar. The safety device includes: a bracket-like structure having a front end and a rear end; a self-defense spray device detachably attached to the bracket-like structure on the front end; a safety alarm device detachably attached to the bracket-like structure on the rear end; and a clamp unit configured between the front end and the rear end mounted on the handlebar, further the clamp unit securely holds the bracket-like structure on the handlebar.

In another embodiment of the present exemplification, a method for protecting a rider riding a bicycle from attacks from an attacker is provided. The bicycle is having a handlebar. The method includes steps of: attaching a safety device to the handlebar of the bicycle, wherein the safety device comprises: a bracket structure having a front end and a rear end extending away from the front end; a self-defense spray device detachably attached to the bracket structure at the front end; a safety alarm device detachably attached to the bracket structure on at the rear end; and a clamp unit disposed between the front end and the rear end and configured to be mounted on the handlebar, wherein the clamp is a C-shaped unit having a clamping slot and an entrance communicating with the clamping slot, wherein the clamping slot is adapted to clamp the handlebar via the entrance; wherein the method further includes the steps of: mounting of the safety device using the clamp unit on the handlebar of the bicycle; being approached by the attacker, wherein the attacker is at least one of an animal; a bird; and a human; choosing at least one of the self-defense spray or the safety alarm device to repel of the attacker; operating the self-defense spray to release a spray to repel of the attacker upon being attacked by the attacker; and operating the safety alarm device to release audio signals to scare off the attacker upon being attacked by the attacker.

Examples of the vehicle include but not limited to bike, bicycle, trike, motorbikes etc. Examples of the attacker include but not limited to an animal such as lion, tiger, deer, bull, wolf, elf etc., human, birds likes eagle, vulture etc.

Pepper spray, although made from an item you can get in the produce section, is considered a weapon by most civilized countries, and is restricted to some extent in nearly all of them. Pepper spray causes temporary blindness, pain, breathing problems and panic: when it's used excessively, it can kill.

In some states, you can buy pepper spray, but the amount is restricted, and you can be arrested or fined if your canister contains more than the amount specified by law. Some states regulate the allowed strength of the pepper spray: most sprays contain somewhere between 2% and 10% of capsaicin, the primary component of *capsicum*. Pepper sprays that also contain tear gas may be illegal in some states but not others, so that before you decide to buy a spray, you should find out what the state and local ordinances say about their possession.

According to pepper spray manufacturers, pepper spray as a personal defense weapon is considered legal in all 50 states, although various state restrictions may prevent shipping to several states. Some manufacturers may ship their bear spray (a stronger pepper spray made to deter an attacking bear) to states where pepper spray can't be shipped as a weapon. However, if someone is found to have used bear spray on a person, there are all sorts of interesting questions about its legal use (unless that person happens to be doing a highly convincing bear act).

Pepper spray isn't sold to minors or to people who have been convicted of a felony. A few instances of state regulations follow: check with your local police force in the restrictions and permissible use of pepper spray in your area. And never take pepper spray with you when you travel by air. Thus, the present exemplification may come up with a safety device without the space for keeping self-defense spray device for selling in specific states in the USA or other parts of the world.

Disclosed is a device and a method for protecting a bicyclist from attacks by persons and/or animals while bicyclist is using the bicycle. The device includes a bracket structure, a safety alarm device, self-defense spray device and a clamp unit. The clamp unit mounts the bracket structure on the bicycle handlebar. The safety alarm device and the self-defense spray device are used to deter/repel/scare off the attacker.

One feature or aspect of an exemplification is believed at the time of the filing of this patent application to possibly reside broadly in a method and a safety device for protecting a rider riding a bicycle from attacks from an attacker.

The components disclosed in the various publications, disclosed or incorporated by reference herein, may possibly be used in possible exemplifications of the present embodiments, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the exemplification, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publication recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiments of the present application . . . " may possibly not be used or useable in any one or more or any embodiments of the application. The sentence immediately above relates to patents, published patent applications and other documents either incorporated by reference or not incorporated by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. section 1.72(b). As stated in 37 C.F.R. section 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments (may be alternatively used as exemplifications) of the exemplification described herein above in the context of the preferred embodiments are not to be taken as limiting the embodiments of the exemplification to all of the provided details thereof, since modifications and variations thereof may be made without departing from the spirit and scope of the embodiments of the exemplification.

While various aspects and embodiments have been disclosed herein, other aspects and embodiments are contemplated. The various aspects and embodiments disclosed herein are for purposes of illustration and not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The embodiments of the exemplification described herein in the context of the preferred embodiments are not to be taken as limiting the embodiments of the exemplification to all of the provided details thereof, since modifications and variations thereof may be made without departing from the spirit and scope of the embodiments of the exemplification.

An exemplification is a protective apparatus for protecting an operator of a steered wheel vehicle from attack by persons and/or animals while operating the steered wheel vehicle by providing the operator access to a plurality of personal protective devices, the steered wheel vehicle comprising a cylindrical member, said protective apparatus comprising: a clamp being releasably attachable to a portion of the cylindrical member and comprising a longitudinal axis, the longitudinal axis of the clamp extending axially along the cylindrical member portion when the clamp is attached to the cylindrical member portion; a bracket attached to the clamp, the bracket being disposed adjacent to an outer side of the bracket spaced vertically away from the clamp longitudinal axis; a first receptacle and a second receptacle, each of the first and second receptacles being carried by the bracket, the first and second receptacles being spaced apart in opposite horizontal directions from the clamp whereby the first and second receptacles are located on opposite sides of the cylindrical member when the clamp is attached to the cylindrical member portion; each of the first and second receptacles being configured and disposed to carry a respective personal protective device; each personal protective device while being carried by the protective apparatus while the protective apparatus is attached to the cylindrical member portion being accessible to the operator for either removal from the apparatus or to actuate an actuator of the receptacle while the protective device is being carried in the receptacle.

Another exemplification of the bracket comprises top and bottom surface portions spaced apart vertically by a thickness of the bracket, and the first receptacle consists of a through-hole extending from the top surface to the bottom surface through the thickness of the bracket, the top surface being configured to cooperate with a personal protective device inserted into the first receptacle from the top surface portion to resist the personal protective device falling through the first receptacle.

Yet another exemplification is a device wherein a first personal protective device comprises a body and a clip attached to the body, the clip being configured to clip the body to clothing received between the clip and the body, the apparatus further comprising: the bracket comprising top and bottom surface portions spaced vertically apart by a thickness of the bracket; the first receptacle being configured to receive and hold the first protective device, the first receptacle comprising first and second through-holes each extending from the top surface portion to the bottom surface portion through the thickness of the bracket; and the first through-hole is configured and disposed to receive and hold the body of the first personal protective device and the second through-hole is configured and disposed to receive the clip of the first personal protective device.

A further exemplification is a protective apparatus wherein the bracket comprises a flat portion extending in a horizontal direction, the first receptacle being disposed in the flat portion.

Yet a further exemplification is a protective apparatus wherein the bracket is an "L"-shaped member having a horizontal bracket section extending substantially perpendicularly to a vertical bracket section, the first receptacle being disposed in the horizontal bracket section.

Yet another exemplification is a protective apparatus wherein the second receptacle comprises a container extending from an open top end to an opposite bottom end vertically spaced below the open end, the container having an interior volume that receives a protective device inserted into the container.

Another exemplification is the protective wherein the bracket is an "L"-shaped member having a horizontal bracket section extending substantially perpendicularly to a vertical bracket section, the second receptacle being attached to the vertical bracket portion.

An additional exemplification is a protective apparatus wherein the horizontal bracket section extends from an upper end of a first side of the vertical bracket section, and the second receptacle container is attached to the first side of the vertical bracket section whereby the horizontal bracket section overlays the open top end of the second receptacle container.

A further exemplification is a protective apparatus wherein the horizontal bracket section comprises a through-hole vertically aligned with the second receptacle container.

Yet a further exemplification is a protective apparatus wherein the second receptacle container is removable attachable to the vertical bracket section whereby the second receptacle container can be removed from the bracket to place or remove a personal protective device into or from the container.

Yet another exemplification is a protective apparatus wherein the vertical bracket section comprises opposite first and second sides, the horizontal bracket section extends from the first side of the vertical bracket section, and the second receptacle container is on the second side of the vertical bracket section wherein the horizontal bracket section does not obstruct vertical insertion or removal of a protective device into or out of the container.

Yet a further exemplification is a protective apparatus wherein the bracket comprises opposite first and ends spaced apart in a horizontal direction from one another whereby the first and second ends are horizontally spaced apart on opposite sides of the cylindrical member when the clamp is attached to the cylindrical member portion; and the first receptacle is formed as a first container attached to the first end of the bracket, the second receptacle is formed as a second container attached to the second end of the bracket, each of the first and second containers comprising an open upper end and extending vertically to a lower end below the upper end whereby a protective device can be inserted into a respective first container or second container from the upper end of the respective container.

Yet an additional exemplification is a protective apparatus wherein the second container comprises a through-opening spaced at or adjacent the lower end of the second container, the through-opening extending through a wall of the second container and being configured to permit an actuator cord of a personal protective device placed in the second receptacle to either extend out the open top end of the second container or to extend out the through-opening of the second container.

Yet another exemplification is a protective apparatus wherein the bracket comprises a substantially semi-circular member, the first and second receptacles attached to the semi-circular member.

Yet a further exemplification is a protective apparatus wherein the substantially semi-circular member is spaced vertically away from the clamp.

Yet an additional exemplification is a protective apparatus wherein the bracket comprises a spacer extending vertically between the clamp and the bracket and thereby vertically spacing apart the clamp and the bracket.

Yet another exemplification is a protective apparatus wherein the spacer extends vertically upwardly away from the clamp and towards the bracket.

Yet a further exemplification is a protective apparatus wherein the clamp is removably attached to the bracket.

Yet an additional exemplification is a protective apparatus comprising a screw removably attaching the clamp and the bracket.

Yet another exemplification is a protective apparatus wherein the clamp is comprises a fixed cap nut that receives the screw.

Yet a further exemplification is a protective apparatus wherein the second receptacle comprises a container extending from an open top end to an opposite bottom end vertically spaced below the open end, the container comprising a wall extending from the top end to the bottom end, a through-hole in the wall being configured to enable sound waves to escape from the container.

Yet another exemplification is a method for protecting an operator of a steered wheel vehicle from attack by persons and/or animals while operating the steered wheel vehicle, the method comprising the steps of: (a) providing a plurality of personal protective devices being held to a bracket formed as a single member; and (b) attaching the bracket with the plurality of personal protective devices to the steered wheel vehicle wherein the personal protective devices are accessible to or can be actuated by the operator while the operator is operating the vehicle.

What is claimed is:

1. A method for protecting a rider riding a bicycle from attacks from an attacker, the bicycle having a handlebar, the method comprising:
    attaching a safety device to the handlebar of the bicycle, wherein the safety device comprises:
        a bracket structure having a front end, a rear end extending away from the front end, and a central portion forming a bracket body between the front end and the rear end;
        a first hole disposed on the front end of the bracket structure;
        a self-defense spray device detachably mounted to the bracket structure in the first hole;
        a second hole disposed adjacent to the first hole;
        a clip configured to attach to the self-defense spray device passes through the second hole;
        a third hole disposed on the rear end of the bracket structure;
        a safety alarm device detachably mounted to the bracket structure in the third hole;
        a clamp unit disposed between the front end and the rear end and configured to be mounted on the handlebar, wherein the clamp is a C-shaped unit having a clamping slot and an entrance communicating with the clamping slot, wherein the clamping slot is adapted to clamp the handlebar via the entrance
        a fourth hole disposed on the central portion of the bracket structure between the first hole and the third hole;
        a screw passing through the fourth hole configured to attach the clamp unit onto the bracket structure;
    said method further comprising the steps of:
        mounting the safety device using the clamp unit to the handlebar of the bicycle;
        adjusting the safety device to a comfortable position;
        getting on the bicycle and riding the bicycle;
        being approached by the attacker, wherein the attacker is at least one of an animal; a bird; and a human;
        evaluating whether the attacker is a real attacker or not a real attacker;
        upon determining whether the attacker is the real attacker considering what to do;
        choosing at least one of the self-defense spray or the safety alarm device to repel of the attacker; and
        upon the self-defense spray or the safety alarm device not being effective using the other of said spray or siren as an additional protection.

2. The method according to claim 1 wherein the safety device further comprises a box assembly to hold the safety alarm device.

3. The method according to claim 2 wherein the safety device further comprises an attachment unit to attach the box assembly to the bracket structure on the rear end.

4. The method according to claim 1 wherein the safety alarm device comprising a siren.

5. The method according to claim 4 wherein the safety device further comprises an activation unit to energize the siren of the safety alarm device.

6. The method according to claim 1 wherein the safety alarm device further comprises a speaker for releasing the audio signals to scare off the attacker.

7. A safety device for protecting a rider riding a bicycle from attacks from an attacker, the bicycle having a handlebar, the safety device comprising:
    a bracket structure having a front end, a rear end extending away from the front end, and a central portion forming a bracket body between the front end and the rear end;
    a first hole disposed on the front end of the bracket structure;
    a self-defense spray device detachably mounted to the bracket structure in the first hole;
    a second hole disposed adjacent to the first hole;
    a clip configured to attach to the self-defense spray device passes through the second hole;
    a third hole disposed on the rear end of the bracket structure;
    a safety alarm device detachably mounted to the bracket structure in the third hole;
    a clamp unit disposed between the front end and the rear end and configured to be mounted on the handlebar, wherein the clamp is a C-shaped unit having a clamping slot and an entrance communicating with the clamping slot, wherein the clamping slot is adapted to clamp the handlebar via the entrance;
    a fourth hole disposed on the central portion of the bracket structure between the first hole and the third hole;
    a screw passing through the fourth hole configured to attach the clamp unit onto the bracket structure.

8. The safety device according to claim 7 further comprises:
    a box assembly to hold the safety alarm device, wherein the safety alarm device comprising a siren; and
    an activation unit to energize the siren of the safety alarm device.

9. The safety device according to claim 7 further comprises an attachment unit to attach the box assembly to the bracket structure on the rear end, and to lock the entrance of the clamp unit.

10. The device according to claim 9 wherein the safety alarm device further comprises a speaker configured on the box assembly for releasing the audio signals received from the safety alarm device to scare off the attacker.

11. A method for protecting a rider riding a bicycle from attacks from an attacker, the bicycle having a handlebar, the method comprising:
- attaching a safety device to the handlebar of the bicycle, wherein the safety device comprises:
  - a bracket structure having a front end and a rear end extending away from the front end;
  - a self-defense spray device detachably attached to the bracket structure at the front end;
  - a safety alarm device detachably attached to the bracket structure on at the rear end; and
  - a clamp unit disposed between the front end and the rear end and configured to be mounted on the handlebar, wherein the clamp is a C-shaped unit having a clamping slot and an entrance communicating with the clamping slot, wherein the clamping slot is adapted to clamp the handlebar via the entrance;

wherein the method further comprising the steps of:
- mounting of the safety device using the clamp unit on the handlebar of the bicycle;
- being approached by the attacker, wherein the attacker is at least one of an animal; a bird; and a human;
- choosing at least one of the self-defense spray or the safety alarm device to repel the attacker;
- operating the self-defense spray to release a spray to repel of the attacker upon being attacked by the attacker; and
- operating the safety alarm device to release audio signals to scare off the attacker upon being attacked by the attacker.

12. The method according to claim 11 wherein the safety device further comprises:
- a first hole disposed on the front end of the bracket structure;
- a third hole disposed on the rear end of the bracket structure; and
- a fourth hole disposed on the bracket structure between the first hole and the third hole.

13. The method according to claim 12 wherein the self-defense spray device is detachably mounted in the first hole, a safety alarm device is detachably mounted in the third hole, and the clamp unit is disposed in the fourth hole.

14. The method according to claim 12 wherein the safety device further comprises:
- a screw passing through the fourth hole configured to attach the clamp unit onto the bracket structure;
- a second hole disposed adjacent to the first hole on the bracket structure; and
- a clip configured to attach to the self-defense spray device passes through the second hole.

15. The method according to claim 11 wherein the safety device further comprises:
- a box assembly to hold the safety alarm device, wherein the safety alarm device comprising a siren; and
- an activation unit to energize the siren of the safety alarm device.

16. The method according to claim 15 wherein the safety device further comprises an attachment unit to attach the box assembly to the bracket structure on the rear end, and to lock the entrance of the clamp unit.

17. The method according to claim 15 wherein the safety alarm device further comprises a speaker configured on the box assembly for releasing the audio signals to scare off the attacker.

* * * * *